(12) United States Patent
Bowen

(10) Patent No.: US 7,993,122 B2
(45) Date of Patent: Aug. 9, 2011

(54) DEVICE FOR IMPROVED REINFORCING ELEMENT WITH A CONTINUOUS CENTER CORE MEMBER WITH VERY LONG FIBER REINFORCED THERMOPLASTIC WRAPPING

(75) Inventor: Stephen T. Bowen, Winona, MN (US)

(73) Assignee: Plasticomp, LLC, Winona, MN (US)

( * ) Notice: Subject to any disclaimer, the term of this patent is extended or adjusted under 35 U.S.C. 154(b) by 137 days.

(21) Appl. No.: 12/204,048

(22) Filed: Sep. 4, 2008

(65) Prior Publication Data

US 2009/0068464 A1 Mar. 12, 2009

Related U.S. Application Data

(60) Provisional application No. 60/970,631, filed on Sep. 7, 2007.

(51) Int. Cl.
*B29C 47/06* (2006.01)
(52) U.S. Cl. ............... 425/113; 425/133.1; 425/204; 425/208; 425/305.1
(58) Field of Classification Search ............ 425/113, 425/133.1, 204, 305.1, 208
See application file for complete search history.

(56) References Cited

U.S. PATENT DOCUMENTS

| 5,876,553 | A | 3/1999 | Kaiser | |
|---|---|---|---|---|
| 6,264,746 | B1 * | 7/2001 | Peng | 118/405 |
| 6,604,929 | B2 * | 8/2003 | Hawley et al. | 425/313 |
| 6,875,385 | B2 * | 4/2005 | Hawley et al. | 264/136 |
| 2002/0031664 | A1 | 3/2002 | Kaiser et al. | |
| 2002/0079607 | A1 * | 6/2002 | Hawley et al. | 264/136 |
| 2002/0172825 | A1 | 11/2002 | Montsinger | |

FOREIGN PATENT DOCUMENTS

CN 2934433 8/2007

* cited by examiner

*Primary Examiner* — Yogendra Gupta
*Assistant Examiner* — Joseph Leyson
(74) *Attorney, Agent, or Firm* — Brannen Law Office, LLC

(57) ABSTRACT

An improved reinforcing element, and devices and methods for producing a wrapped assembly reinforcing element comprising at least one center core member formed from at least one center core strand, wherein the at least one center core member is wrapped with a reinforced thermoplastic resin comprising complete fiber strand dispersion and wet out without breaking fiber filaments after cutting the fiber to a designated length in the wrapping resin. The resulting wrapped assembly may be used in a variety of ways, including virtually any construction project requiring a lightweight reinforcing member with high tensile and compression strength.

6 Claims, 10 Drawing Sheets

DEVICE FOR IMPROVED REINFORCING ELEMENT WITH A CONTINUOUS CENTER CORE MEMBER WITH VERY LONG FIBER REINFORCED THERMOPLASTIC WRAPPING

CROSS-REFERENCE TO RELATED APPLICATIONS

The present application claims priority to provisional application No. 60/970,631, filed on Sep. 7, 2007, the entire contents of which are incorporated herein by reference.

BACKGROUND OF THE INVENTION

1. Field of the Invention

The invention generally relates to devices and methods for manufacturing a continuous center core wrapped with reinforced thermoplastic having very long, fully dispersed and fully wet out filaments.

2. Description of the Related Art

Processes are known for combining reinforcing fiber strands with thermoplastic resin to form reinforced plastic composites. U.S. Pat. Nos. 4,439,387 and Re. 32,772 sharing common inventorship herewith, and incorporated by reference herein in entirety, disclose the embedding of thermoplastic resin in reinforcing fiber strands as they are drawn through a forming die having a convoluted passage, in the presence of molten thermoplastic resin introduced from an extruder. The extrusion product of that process comprises an elongated bar or rod having a continuous length of reinforcing fiber encased within thermoplastic resin. That preformed composite may be inserted into a die of an injection molding machine, and utilized as an insert in a compound, composite product comprising an additional layer of thermoplastic resin molded over the insert. It is also known to cut the extrudate rod from the aforesaid forming die into short lengths for use as molding pellets. In the process of the aforesaid United States patents, the extruded rod comprising a fiber/resin composite is immediately cooled, prior to final forming and cutting to desired lengths.

U.S. Pat. No. 5,185,117, also having identity of inventorship herewith and incorporated by reference herein in its entirety, discloses a process for compounding thermoplastic resin and fiber strands in an extruding compounder. According to the process of that patent, melted thermoplastic resin is introduced into the compounding extruder along with reinforcing fiber strands. The resulting extrudate consists of a molten mass of thermoplastic resin having discrete lengths of fiber strands randomly dispersed therein. This hot mixture may then be fed directly into a preform device to produce a measured preform for use in a compression molding machine. In the disclosed process of the '117 patent, the fiber strands are precut to desired lengths, before being introduced into the extruding compounder. The process and apparatus further requires a loss-in-weight scale to accurately measure predetermined quantities by weight of reinforcing fiber strands to be controllably introduced into the compounding extruder in the presence of thermoplastic resin. A separate loss-in-weight feed scale assembly is required to accurately convey predetermined amounts by weight of the thermoplastic resin into the compounding extruder for mixing in the desired proportions with the reinforcing fiber strands. The loss-in-weight scales necessarily add to the cost and complexity of the compounding apparatus.

U.S. Pat. No. 4,616,989 discloses an apparatus for incorporating glass fiber strands into thermoplastic resins in which a premixing chamber is utilized to initially mix glass fiber strands with molten resin. This mixture is then fed into a two-stage screw-type extruder to complete the mixing of the fiber strands and resin. The resin-fiber mass as discharged from the final extruder is passed through a forming die having a plurality of orifices. This serves to form the material into elongated filaments of glass fiber reinforced resin which are then cooled, and then granulated for use as a molding compound.

U.S. Pat. No. 2,877,501 to Brandt discloses a process for forming granules comprised of glass fiber strands coated with a molding plastic, which are intended for use as feed stock for an injection molding machine. In the Brandt process, fiber strands are pulled through an orifice within which they are coated with a resin material.

U.S. Pat. Nos. 6,186,769; 6,431,847; 6,604,929; 6,676,864; 6,875,385; and 7,169,340, each having common assignment and ownership herewith and each patent being incorporated herein in its entirety, disclose a compact and efficient apparatus and processes for formulating a mixture of fiber reinforced resin for molding purposes are operatively effective for preparing a molding material comprised of fiber reinforced resin for immediate introduction into a molding machine such as an injection molding machine, a compression molding press, a transfer mold, a blow mold, a profile extrusion machine or an inject compression molding machine at the same site where the fiber-resin mixture is made. The referenced patents also disclose formulating a mixture of fiber reinforced resin for molding purposes operate in a controlled and accurate discontinuous manner. Though these references provide distinct advantages over the art, the process and apparatus disclosed therein operate at relatively high pressures, i.e., ranging from 4,000 to 40,000 psi resulting in relatively high shear and speed as the entrained fiber strands move under tension through the coating die. Exemplary speeds are between 80 to 250 feet per minute when the resin is subjected to pressures between 12,000 and 14,000 psi. The high speed and pressure results in, inter alia, shearing forces that cause the fiber strands to break apart. Moreover, the fiber bundles are not efficiently unbundled and as a result remain undispersed, resulting in encapsulation of multiple fibers, without full wet out of individual fibers. Indeed, evaluation of the PUSHTRUSION™ apparatus and process, described by the aforementioned U.S. Pat. Nos. 6,186,769; 6,431,847; 6,604,929; 6,676,864; 6,875,385; and 7,169,340, results in fiber lengths of 3 to 5 mm.

None of the art discloses or suggests apparatus or methods for dispersing the fiber roving so that the thermoplastic material thoroughly wets or impregnates the glass filaments without breaking the very thin glass filaments at the 3 to 5 mm length range.

Longer fibers provide significant improvement in, inter alia, modulus, strength and impact resistance as compared with shorter fibers. According to Thomason & Vlug these mechanical properties are not fully optimized, i.e., all three measures at 95% of potential, until fiber length is about 25 mm, with modulus, strength and impact resistance steadily increasing with lengths upwards of 50 mm. Related to fiber length is the dispersion and distribution of individual fibers. Fully dispersing and distributing individual fibers without breaking and with full wet out is highly advantageous and provides a reinforcing matrix in molded parts that the prior art has not achieved. Moreover, fuller dispersion of the fiber bundles results in fewer cosmetic blemishes; none of the prior art discloses or suggest apparatus or methods for fully dispersing and wetting out the individual fibers with thermoplastic substrate while providing very long, unbroken fibers.

Moreover, present reinforcing elements used in construction projects typically comprise rebar and the like which is normally manufactured from steel. Existing reinforcing elements such as rebar are heavy, subject to corrosion and weakening.

The present invention addresses these, inter alia, problems.

BRIEF SUMMARY OF THE INVENTION

Improved reinforced thermoplastic resin, and devices and methods for producing a wrapped assembly comprising at least one center core member formed from at least one center core strand, wherein the at least one center core member is wrapped with a reinforced thermoplastic resin comprising complete fiber strand dispersion and wet out without breaking fiber filaments after cutting the fiber to a designated length in the wrapping resin. The resulting wrapped assembly may be used in a variety of ways, including virtually any construction project requiring a lightweight reinforcing member with high tensile and compression strength.

One object of the present invention is to provide a device and method for providing a wrapped assembly comprising at least one center core member formed from at least one center core strand, the at least one center core member wrapped with reinforced thermoplastic resin comprising fully dispersed and fully wet out fibers of very long and selectable length.

Another object of the invention is to provide a device and method for forming the at least one center core member and at least one center core strand.

Another object of the invention is to provide a device for providing a wrapped assembly comprising at least one center core member and wrapping comprising a matrix of substantially fully dispersed and substantially fully wet out and very long fibers comprising optimized modulus, strength and/or impact resistance.

The figures and the detailed description which follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION, INCLUDING THE BEST MODE

Figure 1:
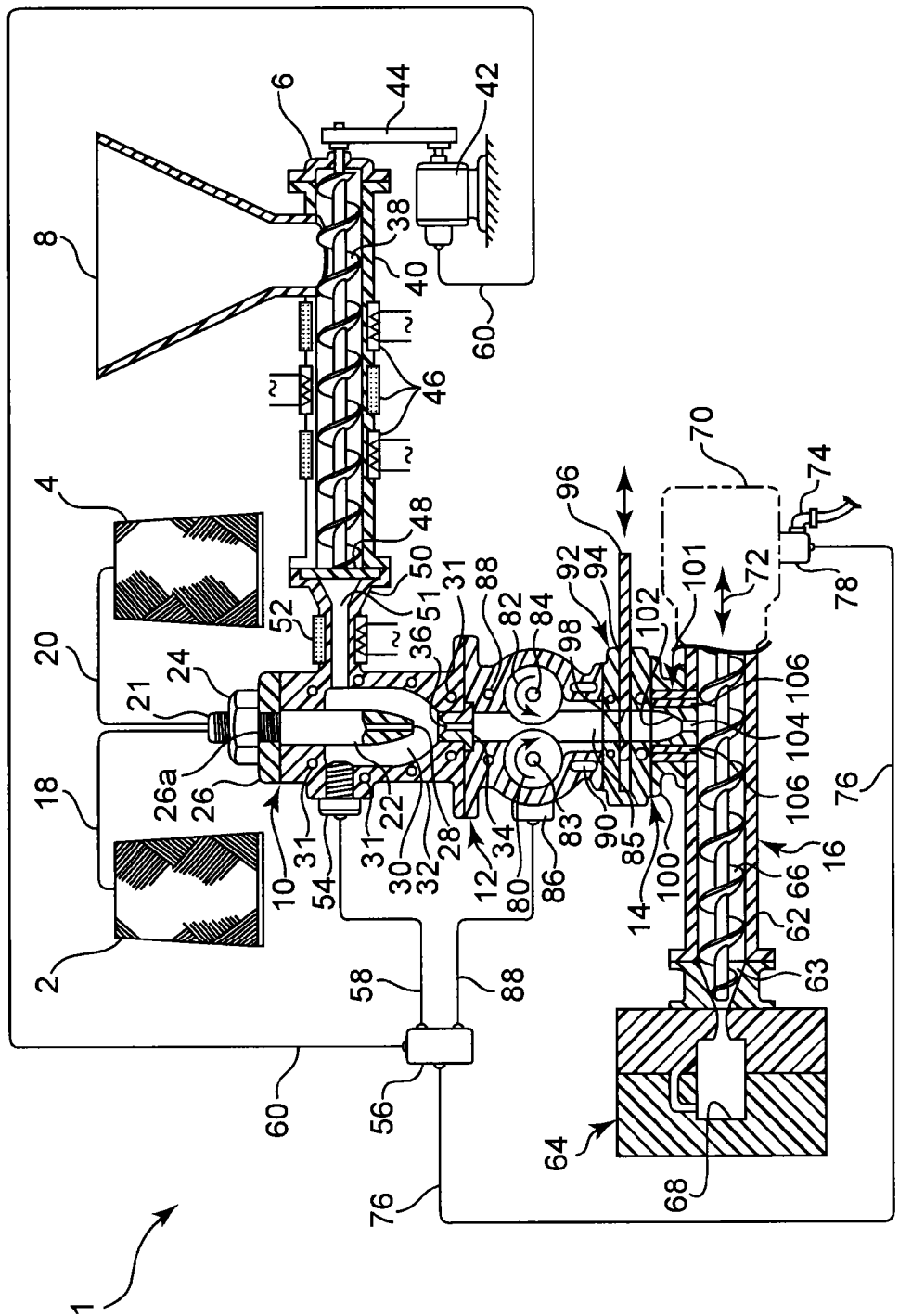
FIG. 1 is a vertical cross sectional view of a known device.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

Referring now to the drawings, there is shown in FIG. 1 an embodiment illustrating a known device, embodying an apparatus and process known in the industry as Pushtrusion™. In this known system, the entire pathway of travel for the entrained fiber within thermoplastic resin is a pressure flow path. Further, the entrained fiber and thermoplastic resin material travels through a coating chamber under pressure prior to being cut to length just before exiting the coating chamber. At this point, the pressure flow path and resulting forces and shear have already broken the fibers into less than optimal lengths that are within the range of 3 to 5 mm. In addition, there is no mechanism that facilitates unbundling of the fibers since the glass fiber is constantly under tension and pressure. Therefore, the glass fiber, comprised of thousands of individual filaments, is simply encapsulated and then broken into small pieces by the known device.

This known apparatus or system is comprised of spools or rolls of fiber 2, 4, a resin supply extruder 6 having a feed hopper 8, a coating die 10, a fiber and resin conveying device 12, a transition nozzle assembly 14, and a receiving device generally indicated by reference numeral 16. Reinforcing fiber strands, such as glass fiber, is supplied from spools or supply rolls 2 and 4 in the form of strands 18 and 20. Each of the strands 18 and 20 actually comprises a bundle of very fine fiber filaments, with as many as several thousand filaments per bundle. These fine filaments have diameters which may range from 10 to 25 microns, by way of example. The fiber strands or bundles may comprise, among others, glass fiber strands and carbon-graphite fiber strands and the like. The use of two supply fiber strands 18 and 20 facilitates splicing the ends of those fiber strands together, in the event that one of the fiber spools 2 or 4 should become exhausted. The fiber strands 18 and 20 are directed into a single guide nozzle 22 having a threaded end 21 secured in place by a nut 24 on top of coating die 10. An orifice plate 26 is mounted on top of coating die 10, and is provided with an orifice 26a through which guide nozzle 22 extends. As is hereinafter set forth, orifice plate 26 may have any number of orifices or ports to receive multiple nozzles 22, and thus to guide multiple strands of fiber 18, 20 into coating die 10. Nozzle 22 has a passage 28 extending therethrough for passage of the fiber into chamber 30 formed within housing 32 of coating die 10.

Housing 32 of coating chamber 10 is provided at its outlet side with an outlet orifice plate 34 having an orifice 36 of predetermined size. As is hereinafter set forth, orifice 36 has a predetermined diameter that will accommodate the fiber strand and a coating of thermoplastic resin thereon.

Thermoplastic resin, preferably in the form of pellets, is provided to resin supply extruder 6 from a feed hopper 8. A feed screw 38 is rotatably mounted within housing or barrel 40 of extruder 6, for rotational driving movement by motor 42. Any conventional drive arrangement, such as the belt 44, may be utilized for transmitting driving power from motor 42 to extruder screw 38. A plurality of electric heaters 46 may be utilized in a conventional manner to heat the resin being propelled through extruder barrel 40. The terms "thermoplastic resin" and "resin" as used herein shall have broader meanings than that normally ascribed to the terms. As used herein, the terms "thermoplastic resin" and "resin" shall be understood to include any resins, polymers, or monomers, including but not limited to polypropylene, nylon, polyurethane, and polyesters, that are suitable for use in a fiber coating apparatus and method according to the present invention. In addition, the terms "thermoplastic resin" and "resin" shall also be deemed to include any thermoset material that may be suitable for use in a fiber coating apparatus and method according to the present invention. It is also to be understood that the present invention may be useful as a conveying device for fibers and fiber strands. In a conveying device, liquids such as water may be used for the entrainment of the fiber strands.

Continuing with the known device of FIG. 1, an orifice or breaker plate 48 is also preferably utilized at the output end of extruder barrel 40. That plate is provided with a plurality of orifices to control the flow of molten thermoplastic resin from extruder barrel 40 into an adapter connector 50 having an internal flow passage 51. An additional electric heater 52 may be provided on adapter 50 to maintain the resin in a molten state at a predetermined temperature as it enters chamber 30 of coating die 10.

Additional electric heating elements 31 are also provided as necessary in the housing 32 of coating die 10 to insure that the molten resin stays heated at a predetermined temperature as it coats fiber strands 18, 20 being conveyed through guide nozzle 22 in chamber 30.

A pressure transducer 54 is preferably threadedly inserted into housing 32 of coating die 10 to sense the pressure therein. A microprocessor type of controller 56 is incorporated in a control system for operational control of various components of the system as hereinafter set forth. Lead 58 from pressure sensor 54 is connected to microprocessor 56, with lead 60 being connected therefrom to drive motor 42 for resin supply extruder 6.

Coupled to the output side of coating die 10 is a conveyor device 12 which is preferably utilized for pulling the fiber strands 18, 20 through coating chamber 30 of coating die 10 and ultimately pushing the mass of fiber and thermoplastic resin into a receptacle or receiving device 16. As shown in FIG. 1, the receiving device 16 may advantageously comprise the barrel 62 of the feed extruder to an injection molding machine 64. A feed screw 66 is rotatably and reciprocally mounted within barrel 62 for feeding charges of resin and fiber molding material into the molding cavity 68 of injection molding machine 64. The feed screw 66 is driven by a standard power unit generally indicated by reference numeral 70 of known design for imparting rotational motion, as well as reciprocal linear movement to screw 66. The arrow 72 indicates the reciprocal path of molding material feed screw 66. Power is supplied to drive unit 70 at a connection 74; and a control lead 76 is connected from an electrical current sensor 78 on the power line to power unit 70 to microprocessor control 56. Current sensor 78 may be of a known design of the induction type.

Various types of conveying devices or mechanisms may be utilized for conveying device 12. The conveying device 12 comprises a pair of rotatably mounted and driven pinch rollers 80, 82 which rotate toward each other as indicated by the directional arrows. Those rollers are mounted on shafts as shown, and driven by a motor and transmission mechanism of any suitable type. For example, a drive motor may be connected to one of the pinch roller shafts 83, with the other shaft 84 being driven by a chain or belt transmission device. The drive motor for the pinch rollers 80, 82 is controlled through a power supply 86, having a control lead 88 which is also connected to microprocessor 56. These pinch rollers 80, 82, urge the entrained fiber in resin material downward through the conveying device by providing tensional force on the entrained material.

In order to insure that the mixture of resin and fiber strands is maintained at the desired high temperature level during the coating within chamber 30, as well as during the conveying through device 12 and into the receiver 16, multiple heating elements are utilized. Additional heating elements 31 are provided within the housing of coating device 10; and heating elements or cartridges 89 and 90 are provided within the housing of conveying device 12.

The coated fiber strands discharging from conveying device 12 are cut into predetermined lengths by a cutting device 92 positioned downstream of the discharge port 85 for conveying device 12. For that purpose, cutting device 92 comprises housing 94 apertured as shown to receive coated fiber from discharge port 85. Housing 92 is slotted to slidably receive a cutting blade 96. Blade 96 is connected to a suitable power source (not shown) of known design for imparting reciprocal linear motion to it. The directional arrow on blade 96 indicates such reciprocal movement. Blade 96 has an inner aperture defined as shown by cutting edges 98. It will thus be seen that as blade 96 reciprocates laterally, with the fiber material discharging from conveying device 12 through port 85 passing through the blade aperture, the cutting edges 98 will alternately and intermittently cut the fiber. The speed of blade 96 is controlled so as to provide fiber of predetermined lengths.

Downstream of cutting knife assembly 92, a transition nozzle assembly 14 is provided for the controlled feeding of a hot molten mixture of resin and fiber strands into receiver 16. As described above, with respect to FIG. 1, that receiver comprises the barrel 62 of an in-feed extruder for injection molding machine 64. The nozzle assembly is comprised of an apertured housing 100 that serves as a transition piece between knife housing 94 and extruder barrel 62. Contained within housing 100 is a nozzle 101 having a flow passage 102 to receive coated and cut fiber strands discharging from cutting knife housing 94. Flow passage 102 preferably is contoured to a tapered shape as shown to provide flow communication with a discharge orifice 104 of predetermined size. Orifice 104 provides a flow restriction to the passage of the mass of coated fiber strands being pushed out of discharge port 85 of conveying device 12. The mass of coated fiber strands is forced through orifice 104 into the barrel 62 of receiver 16.

In operation, fiber strands comprising bundles of filaments 18 and 20 are pulled from supply spools 2 and 4 into guide nozzle 22 of coating chamber 30 of the coating die 10. Molten, fluid thermoplastic resin is forced by extruder feed screw 38 through orifice plate 48 into adapter connector 50, from which the molten resin flows into chamber 30 of coating die housing 32. The controlled operation of heaters 46 and 52 insures that the thermoplastic resin is maintained at a desired high temperature in a fluid state.

The moving bundle of glass fiber strands exiting from the tip of fiber passage 28 within nozzle 22 will collect some of the thermoplastic resin, which will adhere to the fiber strands and move with the fiber bundle, downwardly through mixing chamber 30. This coated fiber bundle will be pulled through outlet orifice 36 of orifice plate 34 by the conveying device 12 under high pressure and shearing force. As described above, the conveying device of the embodiment of FIG. 1 comprises a pair of rollers 80, 82, closely spaced so as to define a nip therebetween. The fiber bundle, coated with thermoplastic resin, is engaged by that nip, between the rollers and pulled through the housing of conveying device 12.

As the bundle of fiber strands and resin is pulled through outlet orifice 36 of the mixing chamber 30, excess resin is scraped off on the side walls of orifice 36. That orifice is of a predetermined size so as to control the resin content and ratio of resin to fiber to that required for the end product being molded. The fiber-resin ratio is expected to be in the range commonly used for reinforced thermoplastics, such as 10 percent to 60 percent glass fiber content by weight. The small diameter size of this orifice 36 further contributes to the shearing forces experienced by the entrained glass fiber.

The pressure sensing transducer 54 located within chamber 30 of the coating die 10 regulates the speed of rotation of resin feed screw 38. This insures that the resin is fed at the desired rate compatible with the movement of fiber strands through guide nozzle 22, by conveying device 12. The desired predetermined weight ratio of fiber and resin is thus achieved. The multiple heating elements 31 in the walls 32 of coating die 10 are further regulated to maintain the desired high temperature within chamber 30 during the fiber coating process. Pressure transducer 54 may also be used to start and stop resin feed screw 38 as required for the batch feeding process of injection molder 64. Sufficient pressure is maintained within chamber 30 so as to maintain good intimate contact of resin with the fiber strands 18, 20, but this benefit comes with a price: shearing forces result in the highly undesirable breakage of the fiber strands 18, 20 into lengths of 3 to 5 mm.

The action of pinch rollers 80, 82 pushes the mass of resin coated fiber strands through apertured cutting knife plate 96. As noted above, that plate reciprocates at a predetermined speed so as to cut off the coated fiber strands in predetermined lengths, as required for the particular physical properties of the product being molded. The slower the reciprocating speed of cutting knife 96, the longer will be the length of each fiber segment that is cut. Either short or long fiber strands may be provided, depending upon the molding application with which the fiber coating and feed apparatus is employed. Short fiber strands on the order of 0.030 inches to 0.050 inches may be utilized for certain applications, whereas long fiber strands of at least ¼ inch in length, and extending up to one inch and greater lengths may be provided as necessary and appropriate for the molding operation, though the cut length of the fiber strands is theoretically limited by the cutting chamber to 1.91 inches, or 48.5 mm, the length of the cutting chamber. However, as discussed above, the entrained fiber is, at and prior to this point in the process, under a great deal of tension and experiencing a great amount of shearing force, both of which combine to, inter alia, cause the fibers to break into pieces comprising lengths of 3 to 5 mm As will be discussed further, for parts requiring, inter alia, high impact resistance, continuous fiber strands contained within the fiber/resin charge 122 with lengths in excess of 5 mm are particularly beneficial, but not possible with this known device.

Figure 2:
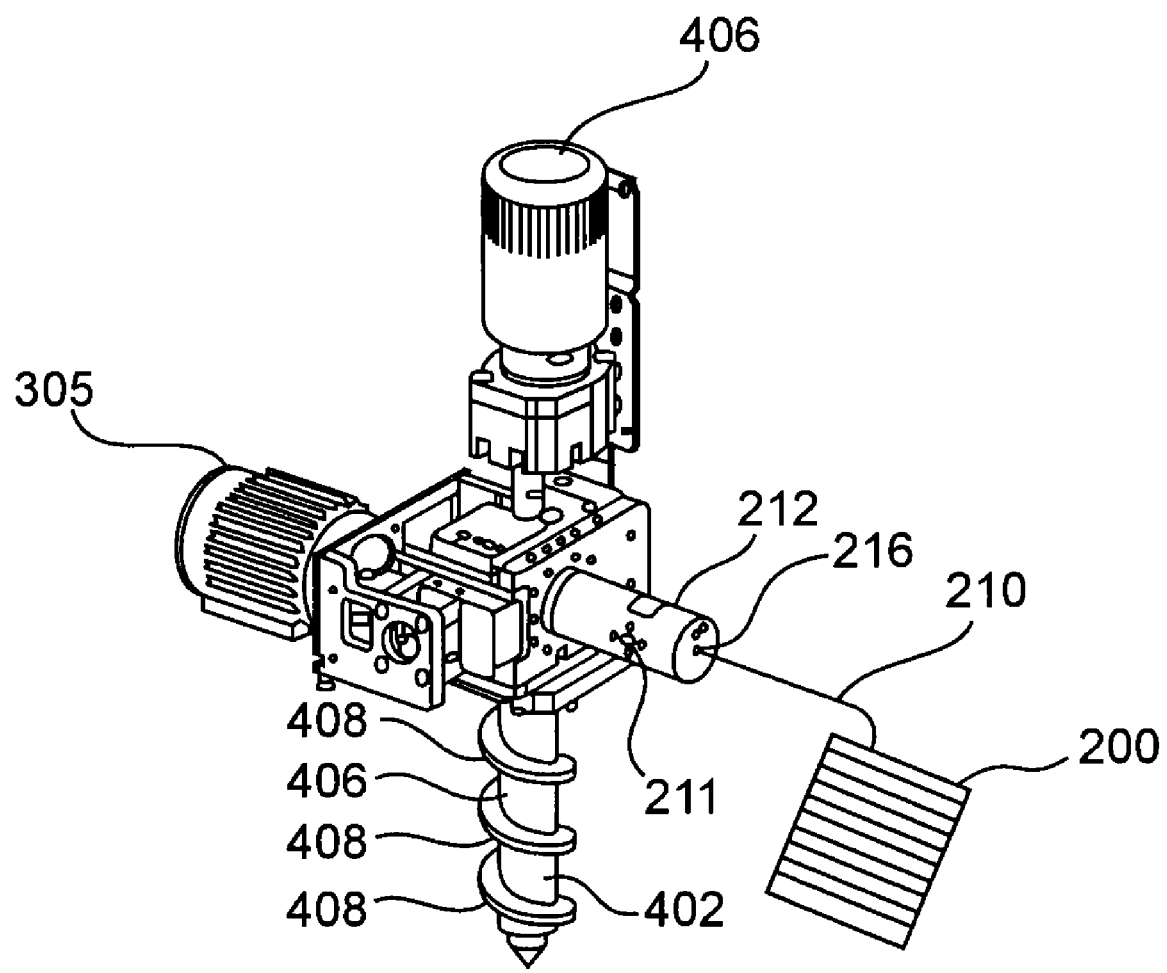
FIG. 2 is a partial cutaway perspective view of one embodiment of the present invention.

One embodiment of the present invention is illustrated in cross section in FIG. 2. In general, a major difference from, and significant improvement over, the known device of FIG. 1 comprises the present invention having no pressure flow path after initial entrainment which results in the individual cut filaments retaining their cut length without breakage throughout the remainder of the process. Additionally, the present invention comprises fiber cutting after entrainment, followed by delivery of the entrained and cut material to the down screw where no-shear mixing and/or kneading of the entrained material is accomplished wherein the reinforced thermoplastic material is gently moved through the apparatus after initial entrainment and cutting of the fiber. In this manner, the fiber bundles are gently and completely unbundled, exposing each individual filament within the cut fiber bundles to the resin wherein each individual filament is encapsulated and fully wet out. This unbundled wet out of the filaments is achieved without subjecting the filaments to tension or shear. As a result, the cut length of the fiber and filaments is retained in the fully wet out reinforced thermoplastic resin of the present invention which may then be incorporated into molded products as is well known in the art.

Products incorporating or utilizing the reinforced plastic composite of the present invention comprising fully dispersed and fully wet out reinforcing fiber filaments of the present invention, however, comprise enhanced mechanical properties owing firstly to the increased filament length and secondly, to the full dispersion and wet out of the individual filaments. These enhanced mechanical properties comprise modulus or stiffness, strength and impact resistance and increase in benefit in a manner that is directly proportional to filament length up to a filament length of approximately 100 mm where studies indicate that maximum benefit for the three mechanical properties is achieved. Moreover, each of these three mechanical properties that are enhanced by the present invention comprise a directly proportional improvement as the fiber lengthens. See Thomason & Vlug. For example, according to Thomason & Vlug, the modulus or stiffness is approximately 95% of optimal at fiber length of 1 mm, while the strength property is less than 40% and the impact strength is about 15% of optimal. Lengthening the fiber causes each mechanical property to become further enhanced, again at different rates. For example, moving from a fiber length of 1 mm to 10 mm, stiffness or modulus improves from about 95% to about 98%, strength improves from less than 40% to about 95% and impact improves from about 15% to about 60%. The improvement of these mechanical properties continues to a fiber length of 40 mm where each of the three mechanical properties of stiffness/modulus, strength and impact are 95% or greater of optimal. Increasing fiber length beyond 40 mm continues to result in slight but steady improvement in each mechanical property of stiffness/modulus, strength and impact. Therefore, the present invention provides a device and method with these, inter alia, mechanical properties at measurable levels that are directly attributable and related to the fiber length.

Moreover, since the individual filaments are unbundled in the present invention, the filamentary matrix that is ultimately achieved within the thermoplastic resin is enhanced over less fully dispersed, fully wet out and broken fiber matrices. This enhanced filamentary matrix provides additional improvement in mechanical properties, inter alia, stiffness or modulus, strength and impact.

Figure 2A:
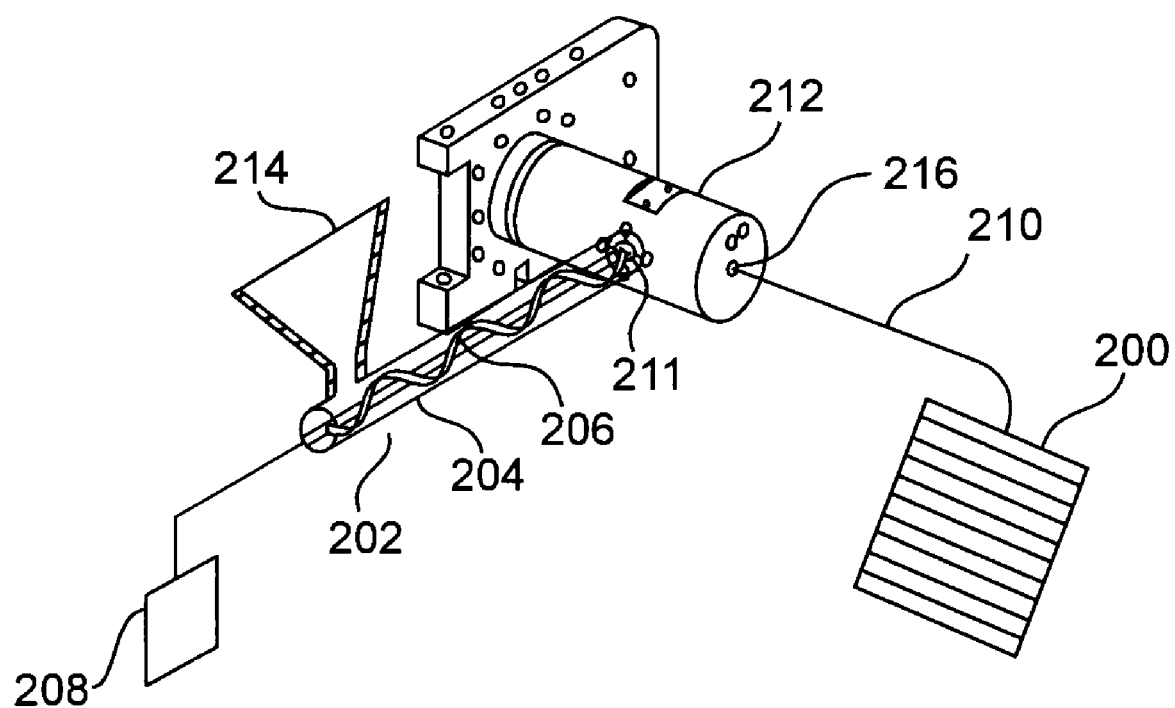
FIG. 2A is a partial cutaway perspective view of one embodiment of the present invention.
Figure 3:
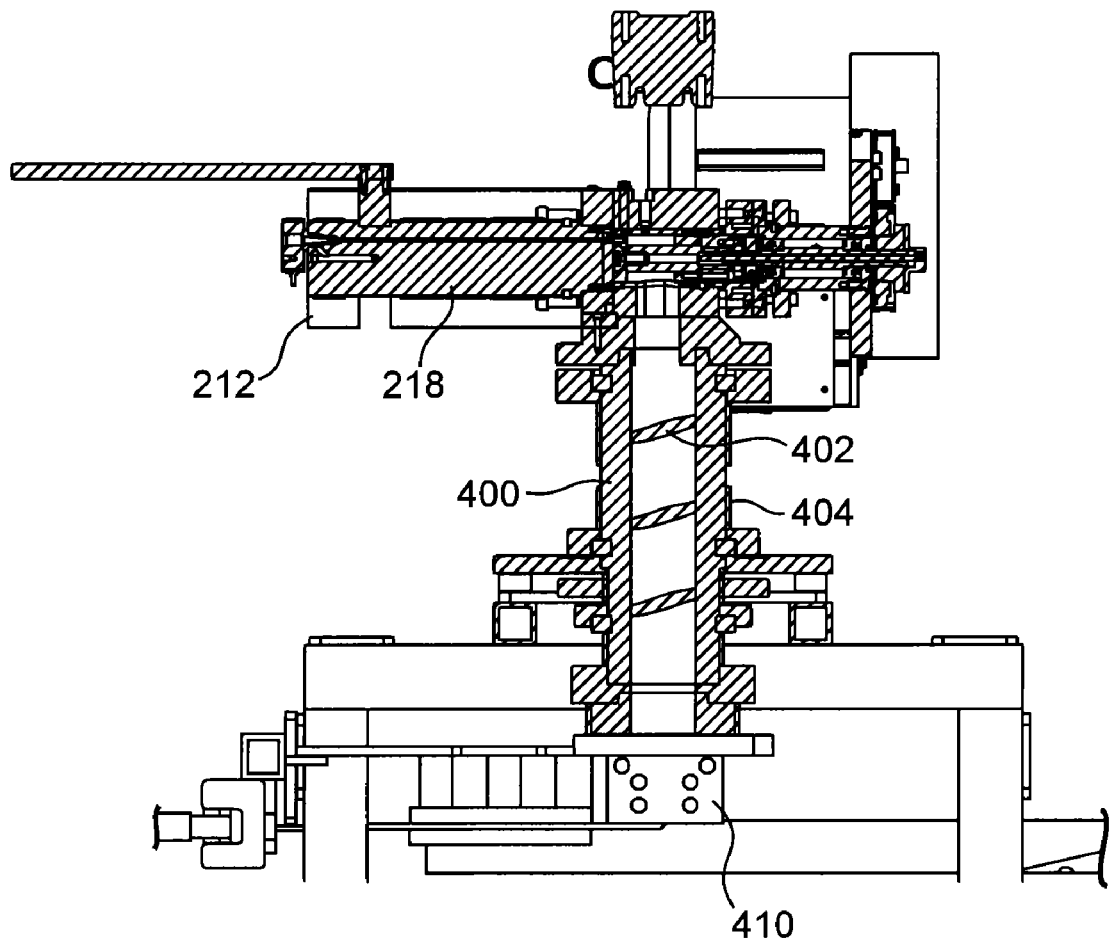
FIG. 3 is a cross sectional view of one embodiment of the present invention.

Turning now to FIGS. 2, 2A and 3, the illustrated embodiment of the present inventive device will be discussed in detail.

As best seen in FIGS. 2 and 2A, at least one spool or roll of fiber 200 may be utilized together with a resin supply extruder 202 comprising a resin supply extruder barrel 204 and feed screw 206, driven by extruder motor 208, in the same way as described above in connection with FIG. 1 to supply a continuous line of fiber 210 entrained in molten thermoplastic resin to an entrainment die 212.

Thermoplastic resin, including in pellet form but not limited thereto, is provided to resin supply extruder 202 from a feed hopper 214. The feed screw 206 rotates within barrel 204, driven by motor 208 in any known manner. Electric heaters may be used to heat the resin being propelled through extruder barrel 202. The output end of extruder barrel 202 is in operative connection and fluid communication with the entrainment die 212, entering entrainment die 212 through resin nozzle 211, resin nozzle 211 allowing fluid communication of the molten resin with the inner chamber 218 of entrainment die 212.

Fiber strand(s) 210 are admitted into the end of the entrainment die 212 via fiber guide nozzle 216, the fiber guide nozzle 216 allowing fluid communication for fiber strand 210 with the inner chamber 218 of the entrainment die 212. The illustrative embodiment of FIG. 2 provides one such fiber guide nozzle 216 and fiber strand 210, however two (or more) fiber guide nozzles 216, each with an associated fiber strand 210 may be employed. As the resin supply extruder 202 supplies molten thermoplastic resin under pressure generated by the feed screw 206 to the entrainment die 212, the at least one fiber strand 210 is entrained therein, encapsulated and moved down the inner chamber 218 of the entrainment die 212 toward the cutting assembly 300. At this point in the process, the at least one fiber strand 210 becomes encapsulated and coated with thermoplastic resin.

A pressure sensor (not shown but as is well known in the art) may be used as described above to control the speed and intermittent operation of feed screw 206 in response to the predetermined resin pressure to be maintained within entrainment die 212.

Figure 4:
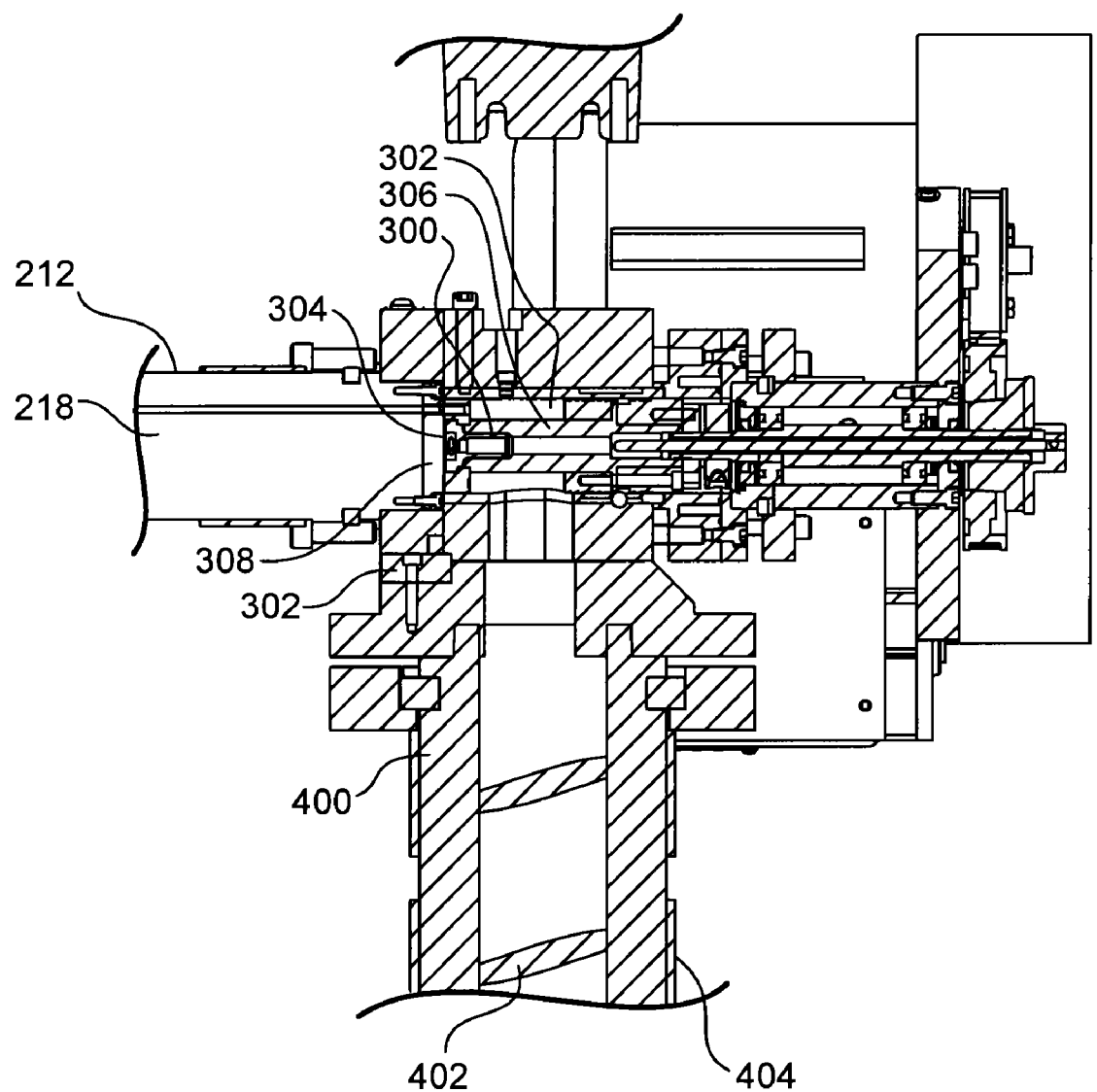
FIG. 4 is a partial cutaway and cross sectional view of one embodiment of the present invention.

The at least one coated fiber strand(s) next encounter a cutting assembly 300, best seen in FIGS. 3 and 4 where one embodiment is illustrated, wherein the coated fiber strand(s) 210 are cut into predetermined lengths. The cutting assembly 300 is in operative communication with the inner chamber 218 of the entrainment die 212 and is capable of receiving the coated fiber strand(s) 210 therein. For that purpose, cutting assembly 300 comprises a housing 302 in fluid communication with the inner chamber 218 of entrainment die 212 to receive coated fiber strands 210. Housing 302 is slotted to slidably receive a reciprocating cutting blade 304. A cutting chamber 306 is defined by the housing 302, the rotating cutting blade 304 and bed knife 308. The length of the cutting chamber 306 defines a maximum length of coated fiber strand 210 material that may be produced by any of various embodiments of the present invention. As will be readily recognized, the cutting chamber length may be varied to suit the particular needs for the subject product. It is desirable to have a cutting chamber length of at least 25 mm, more preferably 55 mm, and still more preferably greater than 50 mm, to allow for fiber lengths that result in optimization of the mechanical properties modulus, impact and strength as described above in reinforced thermoplastic resin of the present invention.

The cutting blade 304 is operatively connected to a motor 305 of known design for imparting rotating reciprocal linear motion to it. It will thus be seen that as blade 304 reciprocates laterally and working in operative communication with bed knife 308, with the fiber material discharging from entrainment die 212 then passing into the cutting chamber 306 ultimately passing through a blade aperture (not shown but as is well known, see, e.g., the device of FIG. 1), the blade 304 will alternately and intermittently cut the fiber. The speed of blade 304 is controlled so as to provide cut fiber of predetermined lengths. The present invention allows the operator to take full advantage of the cutting chamber length if so desired by preventing subsequent breakage of the fibers and unbundled filaments downstream of the cutting operation.

Downstream of cutting assembly 300, the no-shear down screw assembly is in fluid communication with the cutting knife assembly 300, the down screw assembly 400 receiving the coated and cut fibers from the cutting assembly 300. The down screw assembly 400 comprises a screw 402 which is housed within a barrel 404 comprising an inner diameter that is much greater than the diameter of the inner chamber of the entrainment die 212, the screw being driven at a controllable speed by a motor 406 to which it is operatively connected.

The volumetric capacity differential increase from the inner chamber of the entrainment die 212, wherein the molten thermoplastic is pressure fed from the feed screw 206, to the inner diameter of the down screw barrel 404 results in an immediate removal of pressure on the thermoplastic material and the cut fibers encapsulated therein and a resulting slowdown of movement. The primary purpose of this low to no-pressure flow path at this stage is to provide an environment wherein the encapsulated and cut fibers may be gently unbundled and the individual unbundled filaments then coated and fully wet out within the down screw barrel 404. To facilitate this process, the down screw 402 is operated at very low speed, preferably in the range of 10 to 100 rpm, still more preferably within the range of 30 to 60 rpm, and even more preferably within the range of 30 to 40 rpm. This low rotational speed for down screw 402 provides a low to no-shear environment for the cut fibers while still providing gently mixing and kneading of the material therein.

As is best seen in FIG. 2, the down screw 402 comprises an axis 406 and at least two flites 408 thereon which have a substantially constant pitch and depth. The skilled artisan will recognize a large number of configurations that will suffice, but one such configuration as tested comprises three flites, each flite having a pitch of 3.600 and a flite depth of 1 inch, wherein the inner diameter of the down screw barrel comprises 5.200 inches. One significant feature of the present invention is that the volumetric capacity of the down screw barrel 404, when the down screw 402 is housed therein, is exponentially larger than the volumetric capacity of the entrainment die barrel 212. One exemplary entrainment die barrel 212 tested with the above down screw assembly 400 comprises an inner diameter of 0.186 inches. Another exemplary inner diameter for the entrainment die barrel 212 successfully tested with the above down screw assembly 400 comprises 0.236 inches.

Electric heating elements (not shown in the figures but as are well known in the art) may also be provided in or on down screw barrel 404 to ensure that the molten resin therein remains molten and heated at a predetermined temperature as the glass fiber bundles are unbundled to complete dispersion and fully coated and wet out through the down screw barrel 404.

In operation, resin is forced under pressure through the entrainment die 212 by the feed screw 206, thereby drawing the fiber strand(s) 210 into the entrainment die barrel 212 via nozzle 216 in a continuous uncut length where the fiber strand (s) 210 experience an initial encapsulation of thermoplastic resin and are entrained therein.

The feed screw 206 thus delivers the melted thermoplastic resin and entrained and encapsulated fiber strand(s) 210 down the entrainment die barrel 212 until reaching the cutting assembly 300, where the bed knife 308 and mated rotating and reciprocating cutting blade 304 is encountered. At this point, the encapsulated and entrained glass fiber(s) is cut to the desired length which is dependent upon the speed of entry of the coated glass fiber(s) into the cutting assembly 300, the speed of rotation of the rotating cutter 304 and of course the length of the cutting chamber 306 establishes a maximum length limit.

The cut coated glass fiber are now passed out of the cutting assembly 300 and move into the much larger diameter down screw assembly 400 which establishes and provides a continuously very low to no shear environment for the cut and coated glass fibers. The down screw 402 is rotated very slowly at either a preset rotational speed or may be automatically or manually adjusted to compensate for the volume of material moving into the system through the entrainment die barrel 212. The end goal of this step of the process is to thoroughly unbundled, disperse and wet out each individual filament of the glass fibers.

As the now fully dispersed and wet out fiber filaments near the end of the down screw barrel 404, the material then exits slowly and smoothly, with very little shear, through at least two, preferably three or more, very low shear apertures designed to reduce shear and stress on the very long filaments within the reinforced thermoplastic material to prevent breakage. The thermoplastic material now containing very long, fully dispersed and fully wet out filaments may be further processed, e.g., provided to an injection mold or other parts forming device, illustrated as an end die 410 in FIG. 3. The end die 410 of the present invention will be discussed in detail in relation with FIGS. 7-8D.

Figure 6:
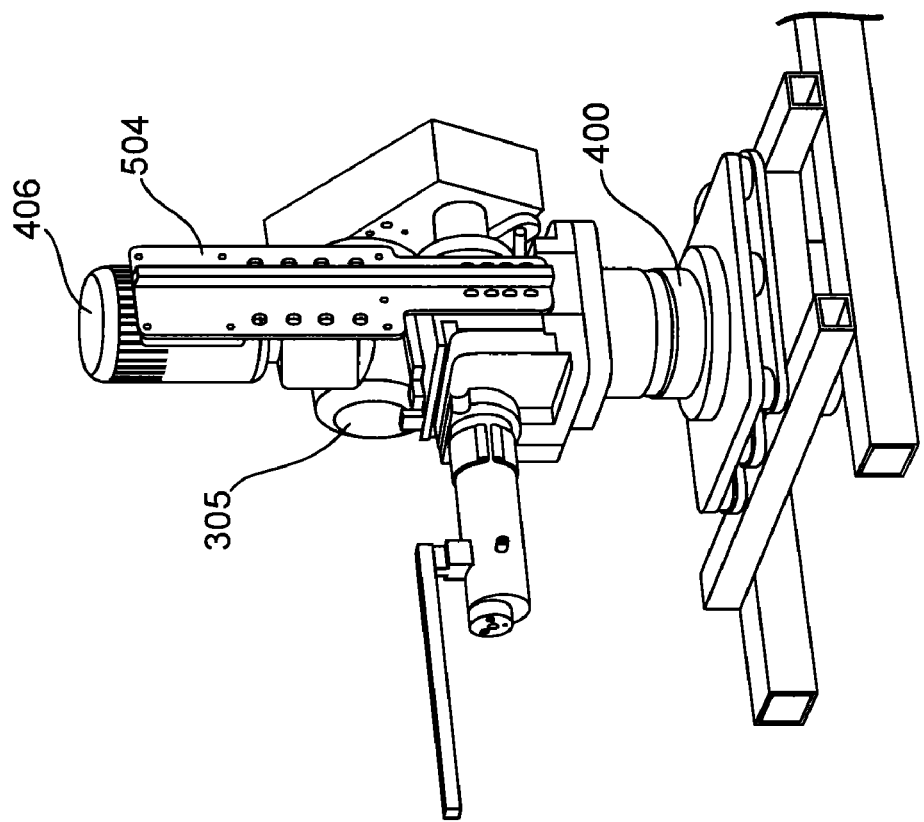
FIG. 6 is a perspective view of one embodiment of the present invention.
Figure 5:
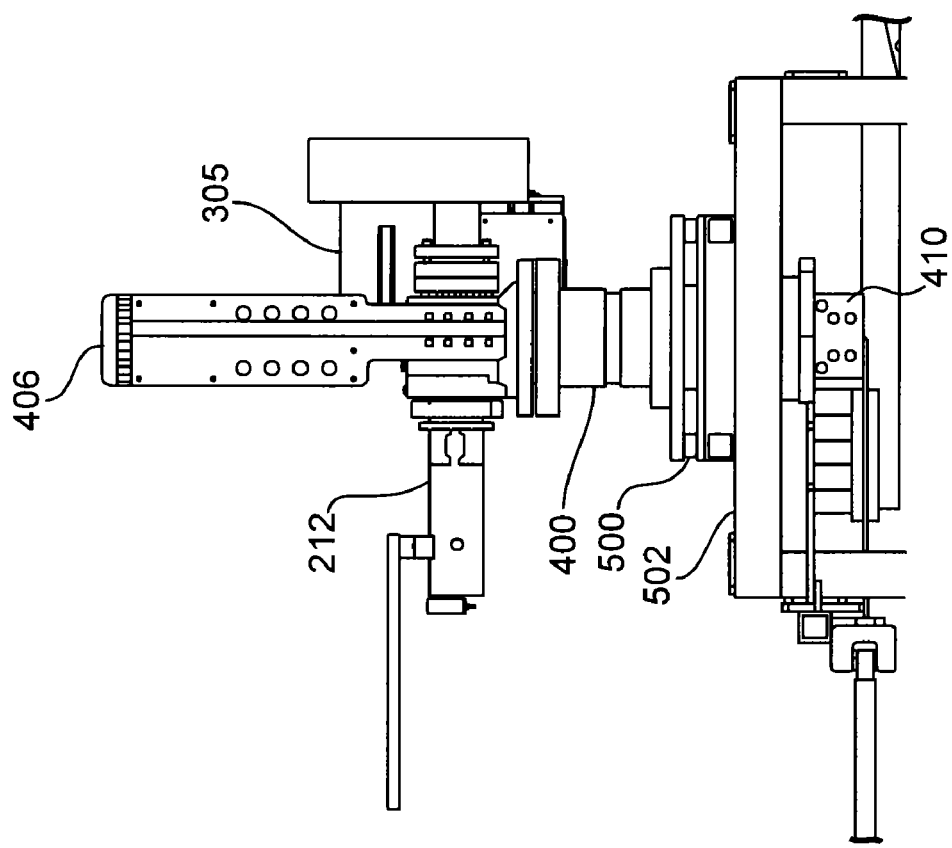
FIG. 5 is a rear view of one embodiment of the present invention.

Turning now to FIGS. 5 and 6, various embodiments of the present invention may comprise a thermal barrier 500 as illustrated in FIG. 5 mounted between the down screw assembly and the main frame assembly 502, to which the device of the present invention, including the entrainment die 212, cutting assembly 300 and down screw assembly 400 are operatively attached, to prevent heat exchange between the down screw assembly 400 and the main frame assembly 502 and to assist in maintaining a constant temperature therein to retain the molten characteristics of the material slowly kneading through the down screw barrel 404. Various embodiments may also comprise a thermal separator 504 as shown in FIG. 6, operatively disposed between the down screw motor 406 and the down screw barrel 404 and down screw 402, to separate the down screw motor 406 from the heat within the down screw assembly 400, including the down screw barrel 404 and down screw 402.

Figure 7:
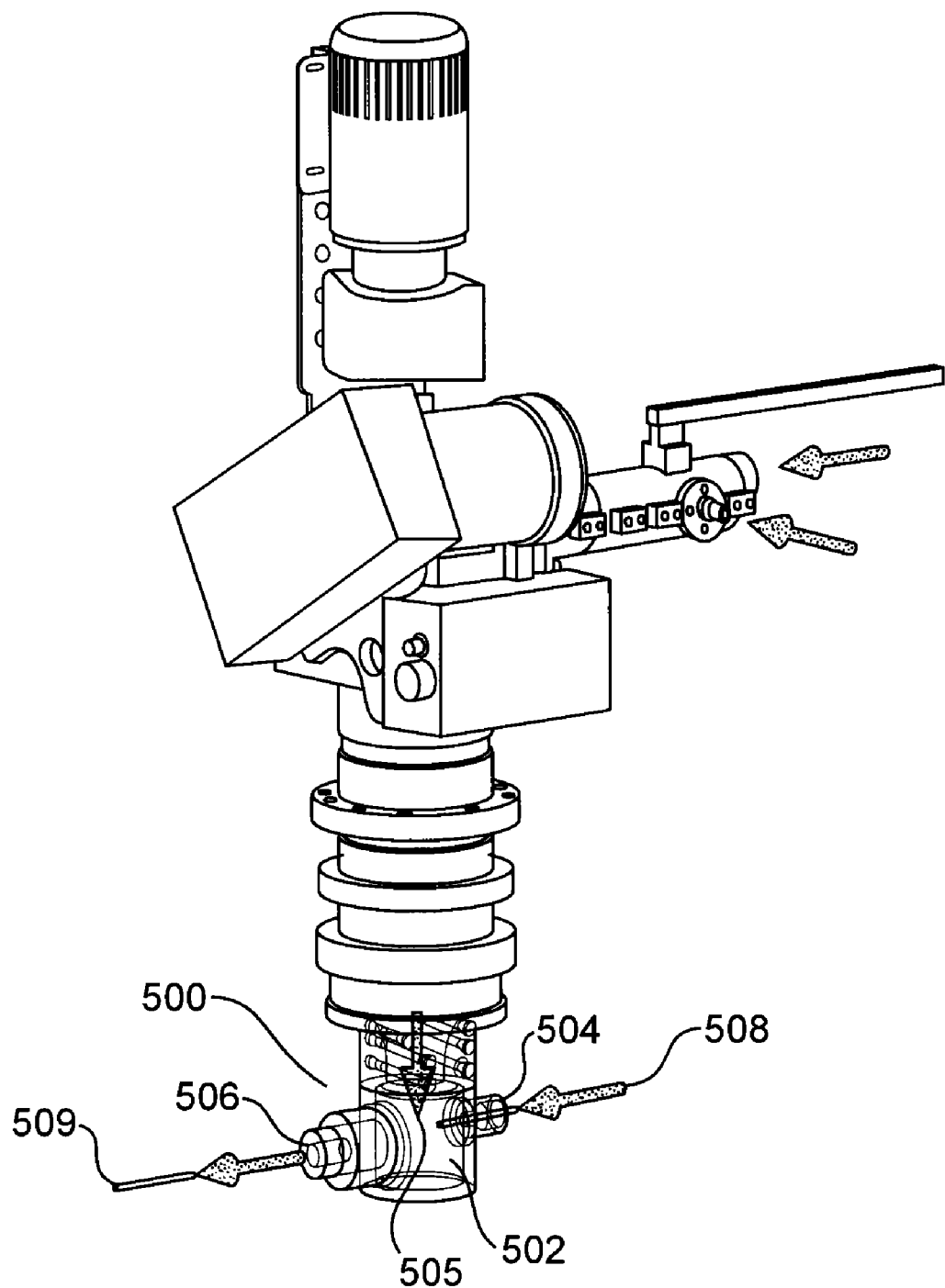
FIG. 7 is a perspective partial cutaway view of one embodiment of the present invention.

FIG. 7 illustrates one embodiment of the present invention comprising an end cross head die assembly 500 which further comprises an inner coating chamber 502, a center core member entry port 504, a center core member exit port 506, and at least one heating element (not shown in the figures but as is well known in the art) to ensure molten thermoplastic resin for wrapping as well as for the remelting of the center core member(s) when they are comprising reinforced thermoplastic resin.

The cross head die assembly 500 is in fluid communication with the interior of the down screw barrel 404, receiving the reinforced thermoplastic resin 505 with very long and fully dispersed and fully wet out filaments as it exits the down screw barrel 404 as described above. The material 505 is then received within the coating chamber 502 where it encounters the at least one uncoated center core member 508. The at least one uncoated center core member 508 is provided in the arrangement and number desired and moved into the center core member entry port 504 where the at least one center core member is received. Urging the at least one center core member forwardly (as indicated by arrows in FIG. 7) results in movement of the uncoated at least one center core member 508 toward the inner coating chamber 502, where the wrapping of the at least one center core member is achieved.

The continued urging of the at least one uncoated center core member 508 in a forward direction as indicated by the arrows in FIG. 7, results in the uncoated center core member 508 encountering the reinforced thermoplastic resin having very long and fully dispersed and fully wet out filaments 505 within coating chamber 502. As the center core member moves through the coating chamber 502, the at least one center core member becomes coated or wrapped with the reinforced thermoplastic resin 502. Continued forward urging of the at least one center core member results in the at least one and now coated or wrapped center core member being received within the center core exit port 506. The thickness, and in various embodiments, the cross sectional profile, of the wrapping material may, in part, be controlled by controlling the forward speed of the at least one center core member through the coating chamber 502 as well as the speed and volume of thermoplastic resin 502 that is encountered within coating chamber 502. In addition, the thickness and cross sectional profile of the wrapping material and the wrapped assembly comprising at least one core member 508 having at least one center core strand C wrapped with thermoplastic resin having very long and fully dispersed and fully wet out filaments, 509, may be achieved and varied by selecting an inner diameter of the center core exit port 506 to match the particular job requirements. For example, a larger inner diameter for exit port 506 will translate into a thicker wrapping and a smaller inner diameter of exit port 506 translates into a thinner wrapping. Thus, any extra wrapping material may be sheared away by the center core exit port 506. The wrapped assembly 509 that results is uniform in the thickness of wrapping and cross sectional profile which may, as with the center core member, be of virtually any profile or shape, including circular, oval, ellipsoidal, square, rectangular and/or polygonal as the ultimate end application requires. In addition, the exit port 506 may be shaped to conform with the shape of the arranged center core members to provide a uniformly thick wrapping surrounding the arranged center core members.

FIGS. 8A-11B illustrate various embodiments for the wrapped assembly 509 of the present invention comprising at least one center core member 508 that is wrapped with reinforcing thermoplastic resin of the present invention. The at least one center member 508 comprising at least one center core strand C may be one or more continuous length(s) of reinforced thermoplastic resin produced as described above or may be of a selected thickness, length and comprising a cross-sectional profile that may be modified according to job requirements. In the embodiments of the present invention comprising center core member(s) manufactured from reinforced thermoplastic resin, the end die 410, described above will form the center core strands C for the at least one center core member 508 into the desired cross-sectional shape or profile having selectable thickness and length. Alternatively, the center core member may comprise one or more of wire, metal such as steel or iron, cloth and the like.

Thus, in various embodiments, the at least one center core member 508, comprising at least one center core strand C, of the present invention, when manufactured from reinforced thermoplastic resin as described above in connection with the device of FIG. 2, comprises very long fibers, i.e., more than 5 mm, more than 10 mm, more than 25 mm or more than 50 mm in length when cut to the selected length. In addition, these embodiments will comprise the at least one center core member 508 comprising at least one center core strand C and having optimized mechanical properties, e.g., modulus, impact and strength, as described above. Further, this embodiment of the present invention will comprise the at least one center core member 508 having optimized matrices within the at least one center core strand C, the matrices comprising fully dispersed and fully wet out fiber filaments as discussed above.

Figure 8A:
FIG. 8A is a perspective view of one strand of reinforced thermoplastic resin produced using, and used by, the present invention.

Thus, FIG. 8A provides the simplest embodiment, wherein the at least one uncoated center core member 508 comprises a single center core strand C prior to wrapping the single center core strand C in the cross head die assembly 500 with a layer of reinforced thermoplastic resin comprising very long, fully dispersed and fully wet out filaments 505 as described above.

Figure 8B:
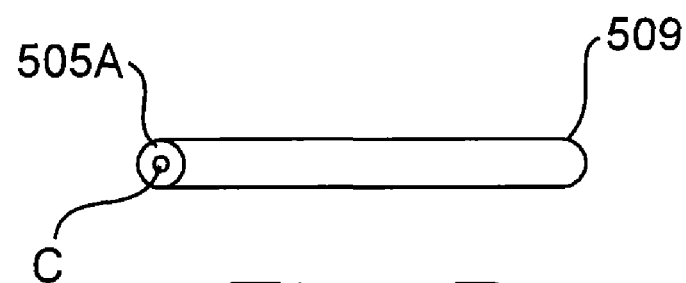
FIG. 8B is a perspective view of one strand of reinforced thermoplastic resin produced by the present invention and with a reinforced thermoplastic resin wrapping of the present invention.

FIG. 8B illustrates the at least one center core member 508 comprising a single center core strand C of FIG. 8A after undergoing wrapping with a uniform layer of reinforced thermoplastic resin 505A comprising very long, fully dispersed and fully wet out filaments in the cross head die assembly 500. The wrapped assembly 509 is the resulting product.

Figure 8C:
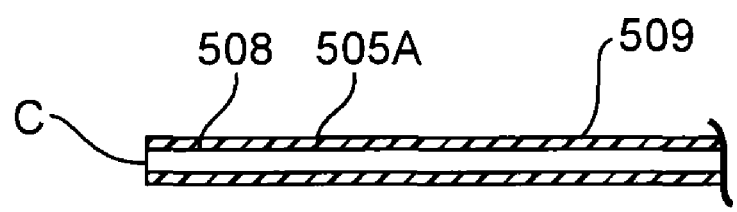
FIG. 8C is a cross-sectional view of one strand of reinforced thermoplastic resin produced by the present invention and with a reinforced thermoplastic resin wrapping of the present invention.

FIG. 8C is a cross-sectional view of the embodiment of FIGS. 8A and 8B. As shown, the wrapped assembly 509 comprises a center core member 508 formed from a single center core strand C, the center core member 508 is further coated, surrounded and wrapped with a uniform layer of reinforced thermoplastic resin comprising very long, fully dispersed and fully wet out filaments 508A.

As noted above, the cross-sectional profile, length and thickness of the at least one center core member strands C and at least one center core member 508 and/or the wrapping 505A are selectable according to the job requirements.

Figure 9A:
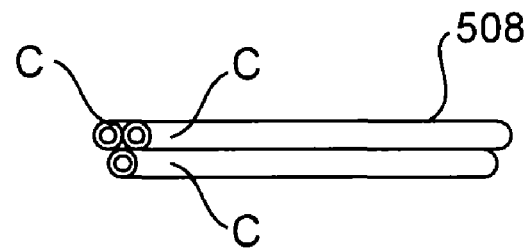
FIG. 9A is a perspective view of one embodiment of center core member comprising three strands of reinforced thermoplastic resin produced using, and used by, the present invention.

FIG. 9A illustrates the at least one uncoated center core member 508 comprising three center core strands C, each center core strand C aligned with and arranged in lengthwise juxtaposition with the other two center core strands C prior to wrapping the at least one uncoated center core member 508, comprising the three center core strands C in the cross head die assembly 500 with a layer of reinforced thermoplastic resin comprising very long, fully dispersed and fully wet out filaments as described above. This embodiment provides for the possibility of remelting of the outer portions of the individual center core strands C either just prior to or during the wrapping process. Such remelting effectively binds the individual center core strands C together to increase the strength of the collective at least one uncoated center core member 508. When the remelted and bound at least one center core member 508 is wrapped with reinforced thermoplastic resin 505A, the resulting wrapped at least one center core member 509 achieves further increased strength and mechanical properties.

Figure 9B:
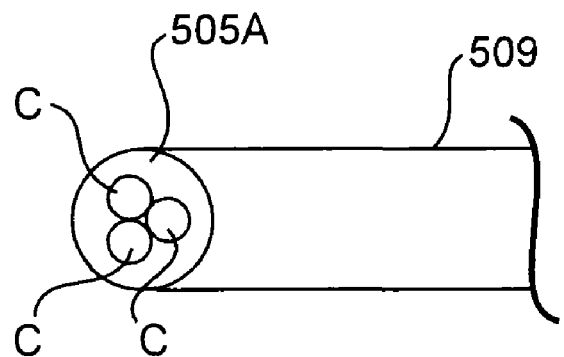
FIG. 9B is a perspective view of one embodiment of center core member comprising three strands of reinforced thermoplastic resin produced by the present invention and with a reinforced thermoplastic resin wrapping of the present invention.
Figure 9C:
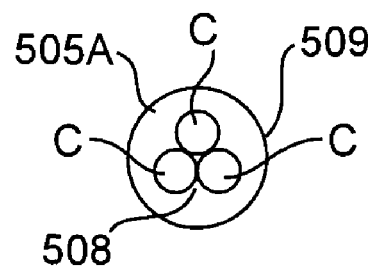
FIG. 9C is an end view of one embodiment of center core member comprising three strands of reinforced thermoplastic resin produced by the present invention and with a reinforced thermoplastic resin wrapping of the present invention.

FIGS. 9B and 9C provide the wrapped assembly 509 comprising the at least one center core member 508 formed from three center core strands C of FIG. 9A after undergoing wrapping with a layer of reinforced thermoplastic resin comprising very long, fully dispersed and fully wet out filaments in the cross head die assembly 500 as described herein.

As shown, the wrapped assembly 509 comprises the wrapped at least one center core member 509 which further comprises a circular cross-sectional profile throughout its length in the illustrated embodiment. Other embodiments of the center core member(s) 508, center core strands C and/or wrapping 505A, as discussed above, may comprise virtually any shape or profile, or combination of shapes or profiles, including but not limited to and cross-sectional ellipsoidal, oval, square, rectangular and/or polygonal shape.

It will be clear to the skilled artisan at this point, that any combination of at least one center core member 508 and/or center core strands C may be employed and either center core member(s) 508 and/or center core strands C may further be arranged in any configuration prior to introduction into the cross head die assembly 500, the number of center core members 508 and/or center core strands C and their arrangement relative to each other being virtually limitless, driven by the demands of the application within which they will be utilized. For example and without limitation, the at least one center core member 508 comprising three center core strands C of FIGS. 8C and 8D may provide the three center core strands C arranged side-by-side within a single plane prior to introduction into the cross head die assembly 500. Other applications may demand more than three center core strands C and/or more than one center core member 508. In the case where more than one center core member 508 is employed and wrapped, the more than one center core member 508 may be arranged so that the more than one center core members 508 are remelted and bound together as described above or may be simply arranged without a remelting and binding connection within the same wrapping 505A. Those skilled in the art will readily recognize the full range of length, thickness or width and arrangements possible for the at least one center core strand C and at least one center core member 508 comprising the wrapped assembly 509 of the present invention. Each such arrangement, length, thickness and/or width is within the scope of the present invention.

Figure 10:
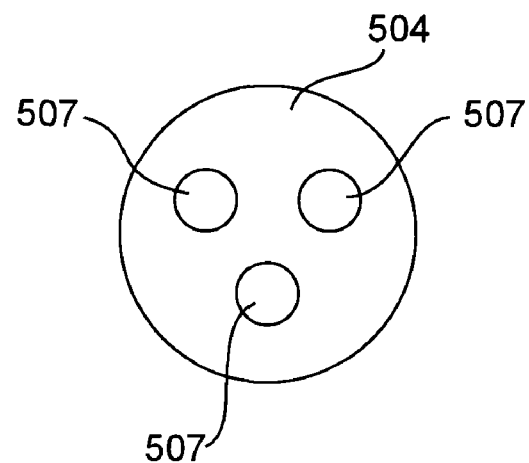
FIG. 10 is an end view of one embodiment of entry port.
Figure 11A:
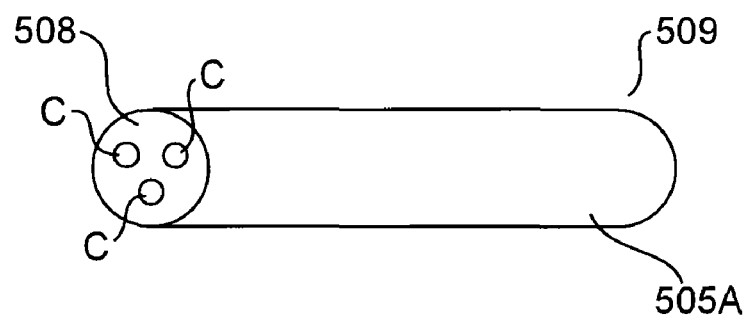
FIG. 11A is a perspective view of one embodiment of center core member comprising three spaced-apart strands of reinforced thermoplastic resin produced by the present invention and with a reinforced thermoplastic resin wrapping of the present invention.
Figure 11B:
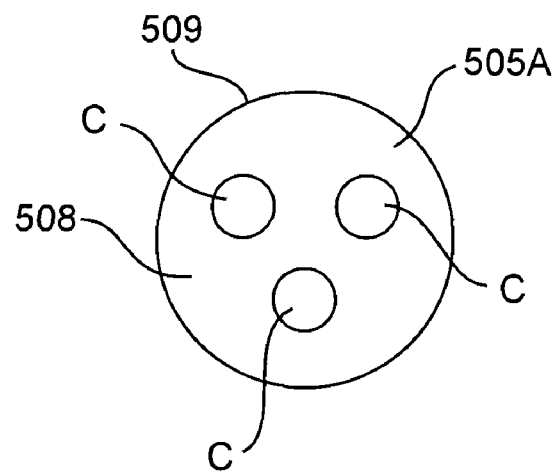
FIG. 11B is an end view of one embodiment of center core member comprising three spaced-apart strands of reinforced thermoplastic resin produced by the present invention and with a reinforced thermoplastic resin wrapping of the present invention.

Turning now to FIG. 10, alternative embodiments of the present invention may comprise at least one center core entry port 504 having more than one spaced apart individual core strand port 507 wherein the at least one center core member 508 comprising at least one center core strand C is received and moved forwardly into the coating chamber 502 where the spaced apart center core strands C are coated and wrapped in the spaced apart configuration and arrangement dictated by the spaced apart individual and more than one core strand entry ports 507 as is illustrated by the perspective and end views in FIGS. 11A and 11B, respectively, of the wrapped assembly 509 comprising the at least one center core member 508 comprising three spaced-apart center core strands C. This arrangement allows the individual center core strands C within the center core member 508 to be slightly separated within the wrapping reinforced thermoplastic resin substrate 505A, thus conferring additional desirable mechanical properties as a result.

Potential uses of the wrapped assembly of the present invention comprise construction projects in need of structural reinforcement. Any project that uses, e.g., metal rebar to reinforce structural features such highway construction, bridge construction, concrete structure construction and the like as is well known to the skilled artisan. The wrapped assembly of the present invention provides very high tensile strength in combination with high compressive and shear strength, but with a much lower weight and cost as opposed to metal rebar material. Further, the wrapped assembly of the present invention is non-corrosive, durable, weatherable and may be shaped into virtually any shape as described above.

Thus, the wrapped assembly of the present invention provides, among other things, a reinforcing element comprising:

at least one center core member, the at least one center core member comprising at least one center core strand; and wrapping around the at least one center core member, the wrapping comprising reinforced thermoplastic resin wrapping having optimized mechanical properties as a result of the individual filaments being of a predetermined length and fully dispersed and wet out.

Further, the reinforcing element of the present invention may comprise the at least one center core member formed from at least one center core strand comprising reinforced thermoplastic resin wrapping having optimized mechanical properties as a result of the individual filaments being of a predetermined length and fully dispersed and wet out.

The reinforcing element of the present invention may further comprising the individual filaments in the wrapping and the at least one center core member having a length of at least 10 mm, or at least 25 mm and/or at least 50 mm.

The reinforcing element of the present invention may also comprise the at least one center core member having more than one center core strand, the more than one center core strands arranged in bound lengthwise alignment and/or the at least one center core member may comprises more than one center core strand, wherein each more than one center core strand is spaced apart from other center core strand(s).

A working and exemplary embodiment of the present inventive device operating according to the present inventive method to produce very long and fully dispersed and wet out filaments comprising the inventive reinforced thermoplastic wrapping 505A and, in some embodiments, the at least one center core strand C comprising the at least one center core member 508 will now be described.

The internal diameter of the entrainment die barrel 212 was evaluated at 0.236 inches in one evaluation and at 0.186 inches in a second evaluation. The down screw 402 itself comprised three flites 408 having a pitch of 3.600 and a flite depth of 1 inch and the down screw barrel 404 internal diameter was 5.200 inches. This configuration of down screw assembly 400 was then operated at a rotational speed of between 30 to 60 rpm to produce reinforced thermoplastic material. The entrainment die barrel 212 and down screw barrel 404 were of approximately equivalent lengths.

A key aspect of the present invention comprises the volumetric capacity of the entrainment die barrel 212 being much less than that of the down screw barrel's 404 loading capacity within the down screw flites 408. This significant increase in diameter as the material moves from the entrainment die barrel 212 to the down screw barrel 404 results in the slowing of the material and loss of pressure and virtually every shearing force present in the known device of FIG. 1.

The speed of the entrainment feed screw 206 and reciprocation of the cutting blade 304 was paired in this working example so that the theoretical length of the cut reinforcing strands would be approximately 25 mm in a first run, approximately 38 mm in a second run, and approximately 50 mm in a third run. As discussed above, the theoretical fiber length maximum limit may be determined by the length of the cutting chamber 306. In this exemplary device, the cutting chamber 306 length was in excess of 50 mm at 3.08 inches or 78.8 mm. The skilled artisan will readily recognize that longer or shorter cutting chamber lengths may be readily engineered using the present invention to suit particular needs.

Reinforced thermoplastic material was also produced using the known device of FIG. 1 as a comparison.

The resulting reinforced thermoplastic material from both devices was then collected and subjected to a burn-off after each run, wherein the thermoplastic resin is removed by heating it to a temperature above 800 degrees Fahrenheit to volatize the organic materials, leaving a "skeleton" of the reinforcing material as it was distributed within the reinforced thermoplastic material for analysis.

The observed results using the known device provide non-dispersed fibers, or fiber bundles, without any significant interconnection or matrices throughout. In addition, the average fiber length was within the range of 3-5 mm, well short of optimal.

In addition, samples of material were obtained and observed after cutting but prior to entry into the down screw barrel 404 of the present invention. These samples were subjected to the burn-off procedure as described above. The observed results for these pre-down screw barrel 404 materials indicate the presence of glass bundles, undispersed and virtually identical with the results of the known device in that regard. A significant difference, however, was noted between the known device results and those of the pre-down screw barrel 404 materials of the present invention: the pre-down screw barrel 404 fibers were unbroken but not at all dispersed, with the glass fibers remaining tightly bundled.

The results using the present invention and working example parameters provided a distribution of reinforcing material that comprise a fully dispersed set of individual filaments that are highly integrated and interconnected to form a matrix of individual filaments. The average filament length was, in this example, observed to be approximately 25 mm after the first run, approximately 38 mm after the second run and approximately 50 mm after the third run. Additional experiments have provided material comprising filament lengths greater than 50 mm. These results further indicate that it is the processing of the material by the down screw 402 that provides full dispersion of glass fibers into individual filaments, without breakage.

The consequences of the improved reinforced thermoplastic resin of the present invention are highlighted by the results of this working example. First, the significant improvement in interconnection between the filaments presents a matrix that is clearly more capable of bearing higher loads and comprising higher mechanical properties such as modulus, impact and strength than the broken short and clumped together filaments of the known device. Second, that the filaments are significantly longer than those produced by the known device results in further enhancement of these mechanical properties.

The skilled artisan will recognize that the parameters used in the above example are all interconnected and modifiable to produce desired throughput of reinforced thermoplastic resin with the desired lengths of fully dispersed filaments therein. All such parameter combinations are well within the knowledge of the skilled artisan and, as such, are within the scope of the present invention.

A method according to one embodiment of the present invention comprises:

providing at least one continuous line of reinforcing fiber;

providing molten thermoplastic resin under pressure to an entrainment die;

entraining and encapsulating the at least one continuous line of reinforcing fiber in the molten thermoplastic resin;

moving the entrained at least one continuous line of reinforcing fiber to a cutting assembly;

cutting the at least one continuous line of reinforcing fiber to a predetermined length;

moving the cut, entrained and encapsulated reinforcing fiber to a down screw assembly;

providing a very low to no-shear environment for the cut, entrained and encapsulated reinforcing fiber within the down screw assembly;

unbundling the cut, entrained and encapsulated fiber to fully disperse the individual filaments within the fiber in the down screw assembly;

fully wetting out the individual filaments within the fiber in the down screw assembly;

ensuring that the individual fully dispersed, fully wet out filaments retain the predetermined length without breaking;

producing a reinforced thermoplastic resin wrapping material having optimized mechanical properties as a result of the individual filaments being of a predetermined length and fully dispersed and wet out;

providing at least one center core member comprising at least one center core strand;

coating the center core member with the reinforced thermoplastic resin having optimized mechanical properties as a result of the individual filaments being of a predetermined length and fully dispersed and wet out.

Other method elements of the present invention may comprise:

producing a reinforced thermoplastic resin wrapping having optimized modulus;

producing a reinforced thermoplastic resin wrapping having optimized impact;

producing a reinforced thermoplastic resin wrapping having optimized strength;

producing a reinforced thermoplastic resin wrapping having optimized matrices therein comprising individual fiber filaments being fully dispersed and fully wet out;

providing at least one center core member comprising more than one center core strands, wherein the more than one center core strands are fixed together lengthwise, and remelting the more than one center core strands together;

providing at least one center core member comprising more than one center core strands, wherein the more than one center core strands are spaced apart from each other;

producing parts comprising a reinforced thermoplastic resin wrapping around a center core member having optimized mechanical properties as a result of the individual filaments of the wrapping being of a predetermined length and fully dispersed and wet out;

producing a center core member wrapped with a reinforced thermoplastic resin having optimized modulus;

producing a center core member wrapped with a reinforced thermoplastic resin having optimized impact property;

producing a center core member wrapped with a reinforced thermoplastic resin having optimized strength; and/or producing a center core member wrapped a reinforced thermoplastic resin comprising reinforced thermoplastic resin having optimized matrices therein comprising individual fiber filaments being fully dispersed and fully wet out.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A device for forming a wrapped assembly comprising at least one center core member wrapped with reinforced thermoplastic resin, the wrapping having fully dispersed and fully wet out individual fiber filaments that retain their cut length, the device comprising:

an entrainment die having an inner chamber with an inner diameter and length and a volumetric capacity, at least one fiber guide nozzle in fluid communication with entrainment die inner chamber, a resin nozzle in fluid communication with the inner chamber of the entrainment die, wherein at least one continuous length of reinforcing fiber comprising a plurality of individual filaments is admitted through the at least one fiber guide nozzle, entrained and coated with molten resin;

a cutting assembly comprising a housing, cutting blade, bed knife and defining a cutting chamber having a length and a motor operatively connected with the cutting blade, the cutting assembly in fluid communication with the inner chamber of the entrainment die, wherein the at least one continuous length of entrained and coated reinforcing fiber is selectively cut to desired length; and a down screw assembly comprising a barrel having an inner diameter, a down screw rotatingly housed within barrel and a motor operatively connected with the down screw, the down screw comprising an axis and two or more flites disposed thereon, each flite having a pitch and a depth, and at least two low shear apertures, the down screw assembly having a volumetric capacity that is substantially greater than said volumetric capacity of said entrainment die and the down screw capable of rotational speeds between 10 rpm and 100 rpm, wherein the cut fiber filaments are unbundled and wet out while retaining the selected cut length as the cut fiber filaments avoid high-pressure induced tension and shear within said down screw assembly and upon exiting of said down screw assembly through said at least two low shear apertures; and a cross die in operative communication with the down screw assembly, the cross die comprising at least one entry port and at least one exit port, the at least one entry port and at least one exit port in fluid communication with an inner coating chamber therebetween whereby the at least one center core member passes through said inner coating chamber and is wrapped with reinforced thermoplastic resin containing the cut fiber filaments with retained selected cut length within said inner coating chamber.

2. The device of claim 1, further comprising a main frame assembly to which the device is secured and a thermal barrier between the down screw assembly and the main frame assembly.

3. The device of claim 1, further comprising a thermal separator operatively disposed between the down screw motor and the down screw barrel and down screw.

4. The device of claim 1, further comprising the volumetric capacity of the entrainment die being exponentially less than the volumetric capacity of the down screw assembly.

5. The device of claim 1, wherein the at least one entry port further comprises more than one individual core strand entry port.

6. The device of claim 1, further comprising the exit port having a selectable cross-sectional shape and width.

* * * * *